(12) United States Patent
Tissier et al.

(10) Patent No.: US 11,603,642 B2
(45) Date of Patent: Mar. 14, 2023

(54) PIN FOR COUPLER ASSEMBLIES

(71) Applicant: Caterpillar Inc., Deerfield, IL (US)

(72) Inventors: Nathan Tissier, Champaign, IL (US);
Nathaniel Harshman, Sullivan, IL (US); David Cox, Monticello, IL (US)

(73) Assignee: Caterpillar Inc., Peoria, IL (US)

( * ) Notice: Subject to any disclaimer, the term of this patent is extended or adjusted under 35 U.S.C. 154(b) by 980 days.

(21) Appl. No.: 16/406,158

(22) Filed: May 8, 2019

(65) Prior Publication Data
US 2020/0354924 A1 Nov. 12, 2020

(51) Int. Cl.
*E02F 9/00* (2006.01)
*F16C 11/04* (2006.01)
*F16C 33/10* (2006.01)
*C25D 3/12* (2006.01)

(52) U.S. Cl.
CPC ............... *E02F 9/006* (2013.01); *C25D 3/12* (2013.01); *F16C 11/045* (2013.01); *F16C 33/1025* (2013.01); *F16C 2350/26* (2013.01)

(58) Field of Classification Search
CPC .......... F16C 11/00; F16C 11/04; F16C 33/00; F16C 33/02; F16C 33/04; F16C 33/06; F16C 33/24; F16C 33/26; F16C 33/28; F16C 33/10; F16C 33/102; F16C 33/1025; F16C 33/103; F16C 2350/00; F16C 2350/26; E02F 9/00; E02F 9/006; C25D 3/00; C25D 3/12
USPC ....................................................... 403/119
See application file for complete search history.

(56) References Cited

U.S. PATENT DOCUMENTS

| | | | | |
|---|---|---|---|---|
| 4,058,174 A * | 11/1977 | Atherton | ................. | E02F 3/764 172/741 |
| 6,042,295 A | 3/2000 | Barden | | |
| 6,926,779 B1 * | 8/2005 | Bin | ....................... | B32B 15/017 148/435 |
| 8,821,022 B2 * | 9/2014 | Akita | ....................... | F16C 17/02 384/279 |
| 2003/0042029 A1 * | 3/2003 | Michael, Jr. | ............ | E02F 3/815 172/781 |
| 2012/0251267 A1 * | 10/2012 | Kuppili | ................. | B60G 21/05 411/378 |
| 2015/0060098 A1 * | 3/2015 | Pohl | ....................... | E02F 3/8152 172/777 |

FOREIGN PATENT DOCUMENTS

JP 2009041659 A 2/2009

* cited by examiner

*Primary Examiner* — Nathan Cumar
(74) *Attorney, Agent, or Firm* — Harrity & Harrity, LLP

(57) ABSTRACT

A pin for a coupler assembly for rotatably coupling a beam of a circle assembly of a grader machine with a bracket of a moldboard assembly of the grader machine includes a body defining a head portion and a shank portion. The shank portion integrally extends from the head portion. The head portion is adapted to be seated over one or more of the beam and the bracket. The shank portion is adapted to pass through the beam and the bracket to rotatably couple the beam and the bracket about the shank portion. A grease gallery is defined through the head portion, extending into the shank portion. The body defines multiple grease passages branching out from the grease gallery up to corresponding sections of an outer surface of the shank portion where the beam and the bracket are correspondingly adapted to lie in rotatable registration with the shank portion.

20 Claims, 3 Drawing Sheets

PIN FOR COUPLER ASSEMBLIES

TECHNICAL FIELD

The present disclosure relates to a pin for a coupler assembly that rotatably couples a moldboard of a grader machine. More particularly, the present disclosure relates to a network of a gallery and passages formed in the body of the pin to facilitate transit of grease or lubricant therethrough.

BACKGROUND

In several applications, a requirement to couple (e.g., rotatably) one component with the other is met by the use of couplers or coupler assemblies. One, among the many areas of application of coupler assemblies is found in machines where components such as beams, brackets, etc., of the machines may need to be rotatably coupled with each other. As an example, machines, such as grader machines, typically use a grader blade (also referred to as moldboard) to displace, distribute, mix, and grade material, such as soil, over a work surface. Grader blades may need to be moved to a variety of positions relative to a work surface to effectively carry out one or more of the aforesaid functions, and, to do so, a bracket to which the grader blade may be operatively coupled to, may be in turn tiltably (e.g., rotatably) coupled to an adjacent structure (such as to a beam extending from a circle member of the grader machine). To facilitate coupling between such a beam and a bracket, a coupler assembly is commonly used. Such coupler assemblies often include a pin that may be passed through the bracket and beam to rotatably couple the bracket with the beam. Over time and/or owing to the harshness of a surrounding terrain, such pins become susceptible to seizure within the components (e.g., the beam and bracket) via which they pass through.

U.S. Pat. No. 8,821,022 ('022 reference) relates to a sliding bearing that includes a bush, a shaft part inserted into a bore of the bush to slide relative to the bush, a grease feeding pathway formed in the shaft part such that the grease feeding pathway extends from one end face of the shaft part to a lateral face of the shaft part, and a grease nipple screwed into one end of the grease feeding pathway to seal the grease feeding pathway. The '022 reference also discloses that the grease nipple needs to be removed for feeding grease into the grease feeding pathway.

SUMMARY OF THE INVENTION

In one aspect, the disclosure is directed towards a pin for a coupler assembly for rotatably coupling a beam of a circle assembly of a grader machine with a bracket of a moldboard assembly of the grader machine. The pin includes a body defining a head portion and a shank portion integrally extending from the head portion. The head portion is adapted to be seated over one or more of the beam and the bracket. The shank portion is adapted to pass through the beam and the bracket to rotatably couple the beam and the bracket about the shank portion. A grease gallery is defined through the head portion, extending into the shank portion. The body defines a number of grease passages branching out from the grease gallery up to corresponding sections of an outer surface of the shank portion where the beam and the bracket are correspondingly adapted to lie in rotatable registration with the shank portion.

In another aspect, the disclosure relates to a grader machine. The grader machine includes a circle member, a beam extending from the circle member, a bracket supporting a moldboard to engage a work surface, a pin, and a grease fitting. The pin includes a body defining a head portion and a shank portion integrally extending from the head portion. The head portion is seated over one or more of the beam or the bracket. The shank portion passes through the beam and the bracket to rotatably couple the beam with the bracket about the shank portion. A grease gallery is defined through the head portion and extends into the shank portion. The body defines multiple grease passages branching out from the grease gallery up to corresponding sections of an outer surface of the shank portion where the beam and the bracket correspondingly lie in rotatable registration with the shank portion. Further, the grease fitting is received within the grease gallery and is fluidly coupled thereto to facilitate supply of grease into the grease gallery and therefrom into the plurality of grease passages and the corresponding sections.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
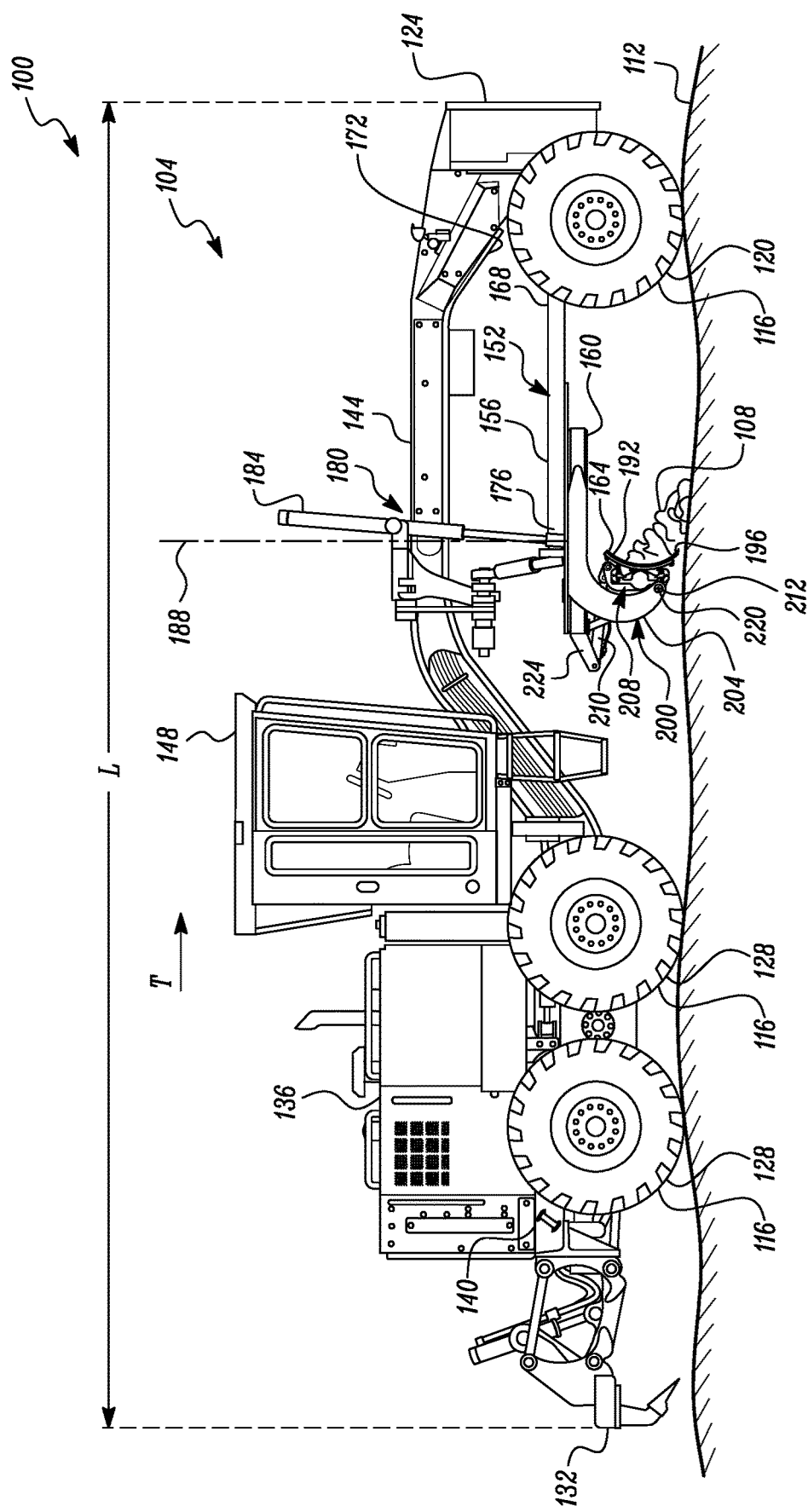
FIG. 1 is a grader machine including an exemplary circle assembly depicted in conjunction with a coupler assembly for rotatably coupling a moldboard of the grader machine, in accordance with an embodiment of the present disclosure.

Referring to FIG. 1, a grader machine 100 is shown, and as depicted, is a motor grader 104. The grader machine 100 may be used to displace, spread, distribute, level, and grade, materials 108, such as soil, over a work surface 112. Generally, a grading operation is performed during machine movement, and for this purpose, the grader machine 100 may include traction devices 116 that facilitate machine movement over the work surface 112. For example, traction devices 116 include a set of front wheels 120 disposed towards a front end 124 of the grader machine 100 and a set of rear wheels 128 disposed towards a rear end 132 of the grader machine 100. The terms 'front' and 'rear', as used herein, are in relation to an exemplary direction of travel of the grader machine 100, as represented by arrow, T, in FIG. 1, with said direction of travel being exemplarily defined from the rear end 132 towards the front end 124. The grader machine 100 defines a length, L, between the front end 124 and the rear end 132.

A movement of the traction devices 116 (i.e., a rotation of the set of front wheels 120 and the set of rear wheels 128) may be powered by a power source, such as an engine (not shown), housed in a power compartment 136 of the grader machine 100. Further, the grader machine 100 may include a main frame portion 140 and a sub-frame portion 144. The sub-frame portion 144 may be movable relative to the main frame portion 140. Further, the grader machine 100 may include an operator cab 148 supported on the sub-frame portion 144, and which may house various controls of the power source and other functions of the grader machine 100.

To grade and level the materials 108, the grader machine 100 may include a drawbar-circle-blade (DCB) arrangement—also referred to as a grader group 152. The grader group 152 may be supported by the sub-frame portion 144, and may include a drawbar 156, a circle member 160, and a blade (referred to as a moldboard 164), each of which may function in concert to perform a grading operation on the work surface 112.

The drawbar 156 may include a first end 168 pivotally coupled to a front end portion 172 of the sub-frame portion 144 and a second end 176 movably supported by another portion (such as a mid-portion 180) of the sub-frame portion 144. For example, the second end 176 of the drawbar 156 may be coupled to the mid-portion 180 of the sub-frame portion 144 via one or more actuators, such as a hydraulic actuator 184. The hydraulic actuator 184 may be actuated to raise or lower the second end 176 of the drawbar 156 with respect to the sub-frame portion 144, in turn allowing the grader group 152 to be raised or lowered relative to the work surface 112. The circle member 160 of the grader group 152 may rotate relative to the drawbar 156 about a rotation axis 188 that passes through a center of the circle member 160, and the moldboard 164 may be coupled to the circle member 160 to rotate along with the rotation of the circle member 160 about the rotation axis 188. The moldboard 164 may include a face 192, such as a concave face, that may help receive and agglomerate the materials 108 over the work surface 112, as shown. As an example, the moldboard 164 may define an edge 196 at a bottom end (i.e., closer to the work surface 112) of the face 192 to help engage and scrape the materials 108 off the work surface 112 and distribute, level, and grade the work surface 112, during a grading operation.

Figure 2:
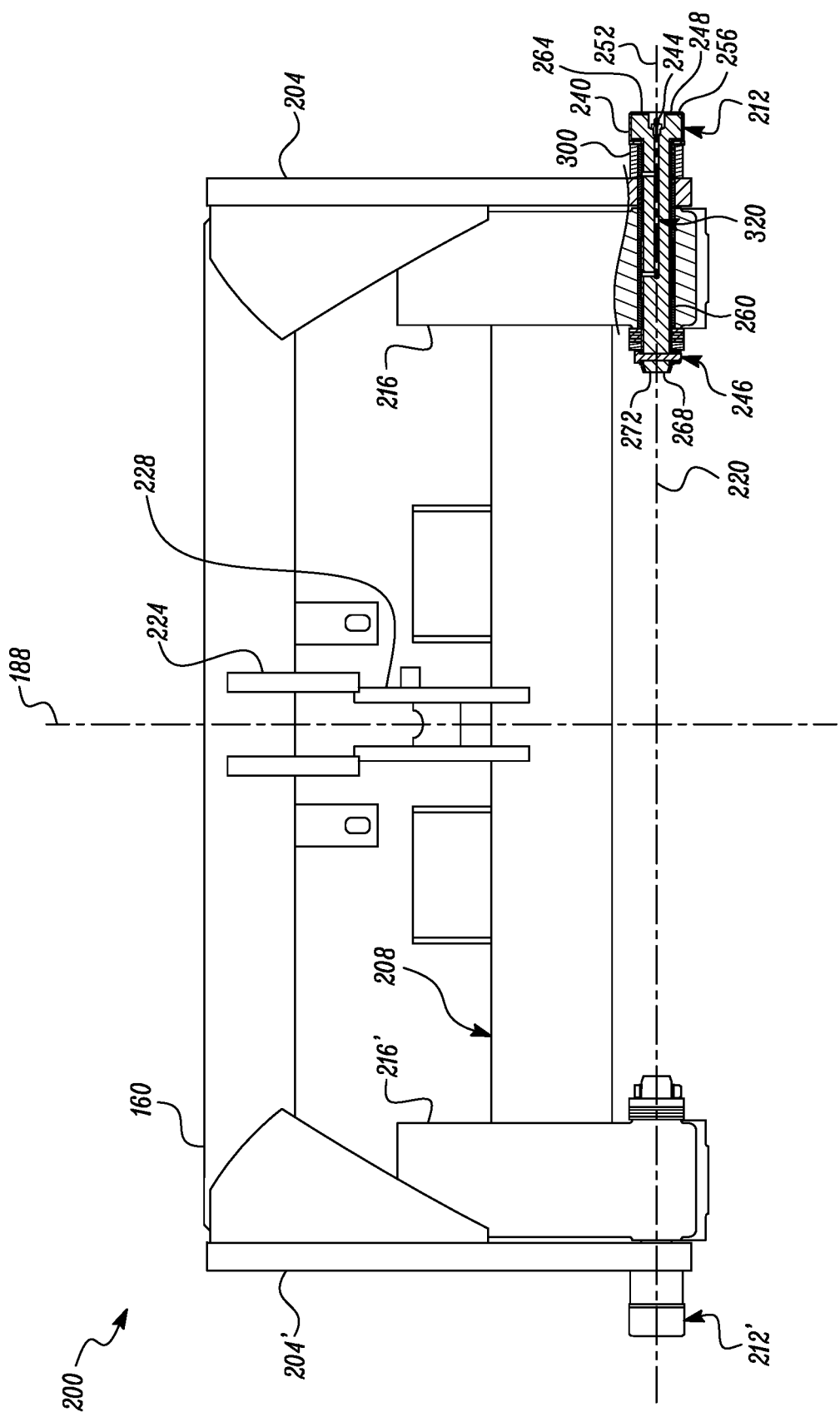
FIG. 2 is a rear side view of the circle assembly in conjunction with the coupler assembly, with a beam of the coupler assembly being rotatably coupled to a bracket supporting the moldboard by way of a pair of couplings, in accordance with an embodiment of the present disclosure.

Referring to FIGS. 1 and 2, and according to an aspect of the present disclosure, the moldboard 164 is coupled to the circle member 160 by way of a coupler assembly 200. The coupler assembly 200 includes a pair of beams 204, 204' (also see FIG. 2) a bracket 208, and a pair of couplings (e.g., a first coupling 212 and a second coupling 212') (FIG. 2), details pertaining to each of which will now be discussed.

The pair of beams 204, 204' may be fixedly coupled to the circle member 160 thus being rotatable as the circle member 160 executes a rotation relative to the drawbar 156. The pair of beams 204, 204' may extend (e.g., towards the work surface 112) from the circle member 160 in an axial direction (such as along the rotation axis 188). It may be noted that only one of the beams 204, 204' (i.e., beam 204) is shown in FIG. 1 since the other of the pair of beams (i.e., beam 204') is hidden behind the beam 204 in the orientation of the grader group 152 provided in FIG. 1. Nevertheless, the other of the pair of beams (i.e., beam 204') may be viewed in FIG. 2. The beams 204, 204' may be diametrically opposed and spaced apart from each other across the circle member 160. For ease of understanding, the pair of beams 204, 204' may be independently referred to as a first beam 204 and a second beam 204'.

The bracket 208 may slidably support the moldboard 164 by way of a retention assembly (not explicitly shown) so as to allow the moldboard 164 to slide sideways relative to the bracket 208. The bracket 208 may define a first bracket portion 216 and a second bracket portion 216'. The first bracket portion 216 may be rotatably coupled to the first beam 204, while the second bracket portion 216' may be rotatably coupled to the second beam 204'.

The pair of couplings 212, 212' facilitate the aforesaid rotatable coupling between the bracket 208 and the pair of beams 204, 204', and enables the bracket 208 to tilt relative to the first beam 204 and the second beam 204' about a common axis 220. As noted above, the pair of couplings 212, 212' may include (and/or be individually referred to as) a first coupling 212 and a second coupling 212'. The first coupling 212 may rotatably couple the first beam 204 with the first bracket portion 216 of the bracket 208, while the second coupling 212' may rotatably couple the second beam 204' with the second bracket portion 216' of the bracket 208. An actuator 210 (see FIG. 1) may be coupled between a pivoting joint 224 disposed on the circle member 160 and hinge plates 228 disposed on the bracket 208. The actuator 210, upon actuation, may allow the bracket 208 to be tilted (or rotated) relative to the circle member 160 and the pair of beams 204, 204' about the common axis 220—in turn allowing the moldboard 164 to tilt (or rotate) about the common axis 220 and relative to the pair of beams 204, 204' to assume various positions, as desired during operations.

The forthcoming disclosure includes details pertaining to the pair of couplings 212, 212' and their arrangement with the pair of beams 204, 204'. Such details have been discussed by way of reference to the first coupling 212, the first beam 204, and the first bracket portion 216 of the bracket 208, alone. Similar or equivalent details may be contemplated for the second coupling 212', second beam 204', and the second bracket portion 216', as well. Wherever required, reference to the second coupling 212' may also be explicitly used. Such references may use nomenclatures and annotations similar to those that have been used for the first coupling 212, but may be differentiated by a 'prime mark', as may be understood by now. For ease, the first coupling 212 will be interchangeably referred to as a coupling 212. The first beam 204 may also be simply referred to as beam 204. The coupling 212 includes a pin 240, a zerk-fitting or a grease fitting 244, and a retainer unit 246 (see FIG. 3), as shown.

Figure 3:
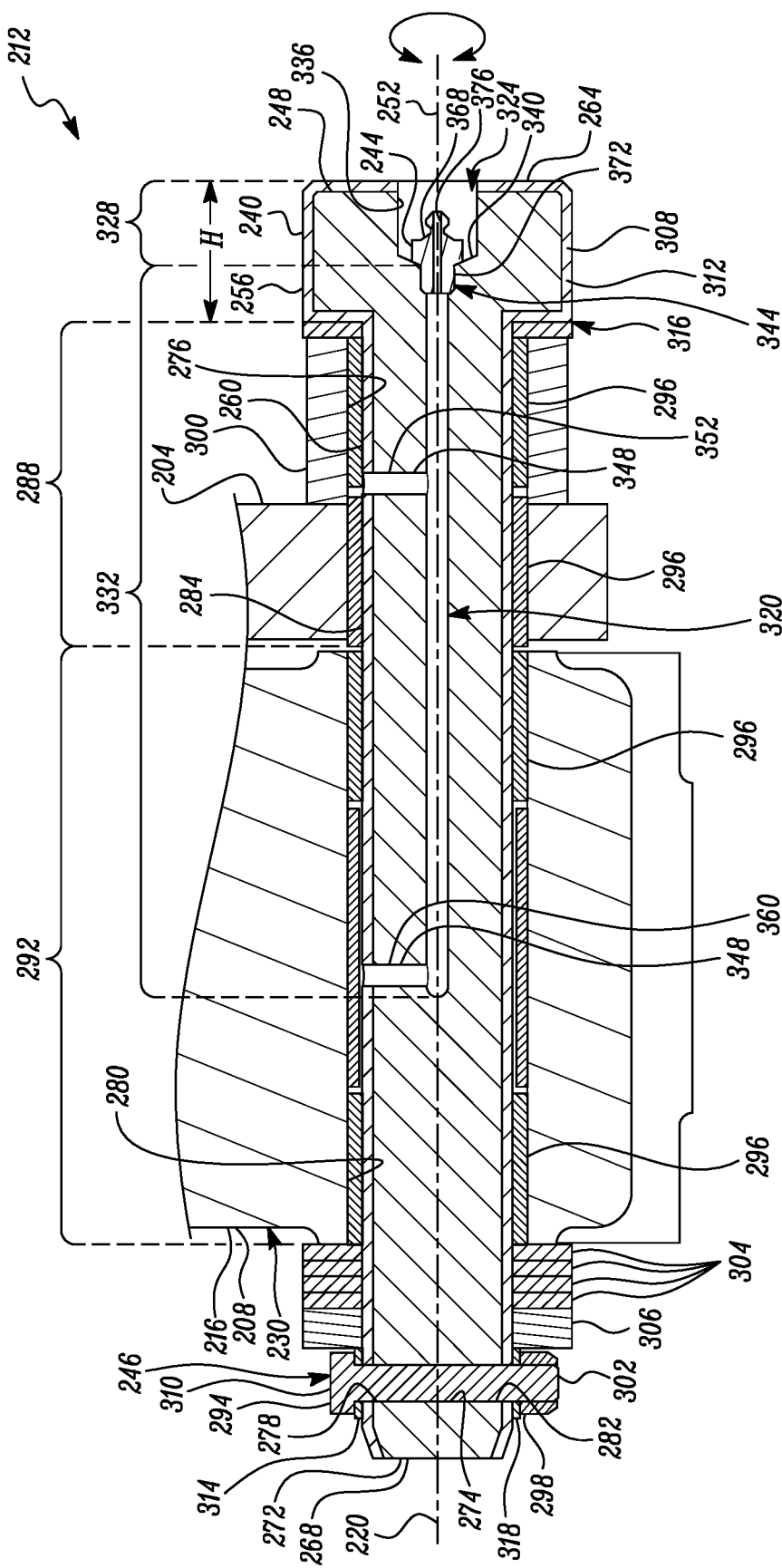
FIG. 3 is an enlarged cross-sectional view of the one of the coupling of the pair of couplings, in accordance with an embodiment of the present disclosure.

Referring to FIGS. 2 and 3, the pin 240 may include a body 248 having an elongated profile. For example, the body 248 defines a longitudinal axis 252, with a head portion 256 and a shank portion 260 both extending along the longitudinal axis 252. The shank portion 260 may be integrally formed as one unitary unit with the head portion 256, and thus may integrally extend from the head portion 256. Both the shank portion 260 and the head portion 256 may include a circular cross-sectional area defined around the longitudinal axis 252, although it may be contemplated that the head portion 256 may define a non-circular cross-sectional area, in some cases. A cross-sectional area of the head portion 256 may be larger than a cross-sectional area of the shank portion 260.

Further, the head portion 256 defines a first axial end surface 264 of the body 248, while the shank portion 260 defines an end 268 remote to the head portion 256, with the end 268 defining a second axial end surface 272 of the body 248. According to one example, the shank portion 260 defines an outer surface 284 (e.g., cylindrically-shaped outer surface), and the end 268 may include a through-hole 274 passing through and across the body 248 of the pin 240, such that openings 278, 282 of the through-hole 274 may be revealed diametrically oppositely at the outer surface 284. The body 248 of the pin 240, as disclosed, may be made from any relatively high grade reinforced material, such as reinforced steel, to effectively withstand the stresses of operation.

In an assembly of the pin 240 with the beam 204 and the bracket 208, the shank portion 260 is adapted to pass through the beam 204 and the first bracket portion 216 of the bracket 208 to rotatably couple the beam 204 and the first bracket portion 216 of the bracket 208 about the shank portion 260. For this purpose, each of the beam 204 and the first bracket portion 216 may include respective passageways (e.g., circular passageways) to allow the shank portion 260 to pass through. For example, the beam 204 includes a first passageway 276 and the first bracket portion 216 of the bracket 208 includes a second passageway 280. In one example, the outer surface 284 defines sections, for example, a first section 288 and a second section 292 corresponding to which the beam 204 and the first bracket portion 216 may lie in rotatable registration with the shank portion 260. More specifically, the first passageway 276 of the beam 204 may lie in rotatable registration with the first section 288 of the outer surface 284 of the shank portion 260, while the second passageway 280 of the first bracket portion 216 may lie in rotatable registration with the second section 292 of the outer surface 284 of the shank portion 260.

Although not limited, both the first passageway 276 and the second passageway 280 may include similarly sized and dimensioned cross-sectional areas that may rotatably receive the shank portion 260 therein. According to some examples, a passage of the shank portion 260 through the first passageway 276 and the second passageway 280 is such that the longitudinal axis 252 is inline or co-axial with the common axis 220 and is also co-axial with respective axes (not annotated to save clarity) defined by the first passageway 276 and the second passageway 280. Further, the cross-sectional areas of each of the first passageway 276 and the second passageway 280 may be larger than the cross-sectional area of the shank portion 260, but said cross-sectional areas of the first passageway 276 and the second passageway 280 may be smaller than the cross-sectional area of the head portion 256. The relatively larger cross-sectional area of the first passageway 276 and the second passageway 280 in comparison to the cross-sectional area of the shank portion 260 allows one or more bearings 296, such as bush bearings, to sit between the shank portion 260 and each of the bracket 208 and the beam 204, permitting the shank portion 260 (and in turn the body 248 of the pin 240) to freely and steadily rotate relative to the bracket 208 and the beam 204, about the common axis 220.

Furthermore, in assembly of the coupling 212 with the bracket 208 and the beam 204, the head portion 256 may be seated over one or more of the beam 204 and the bracket 208 owing to the head portion 256's larger cross-sectional area in comparison to the cross-sectional areas of the first passageway 276 and the second passageway 280. Such seating disallows and restricts further movement (e.g., axial movement) of the pin 240 through the first passageway 276 and the second passageway 280. Optionally, one or more shims or spacers plates or spacer members (see exemplary spacer member 300) may be positioned in between the head portion 256 and the beam 204. According to the illustrated embodiment, the head portion 256 is seated on the beam 204, although, in certain cases, the pin 240 may be inserted from an opposite side of an assembly 230 of the beam 204 and the bracket 208, as illustrated, and thus the head portion 256 may be seated on the first bracket portion 216 of the bracket 208 instead. With the head portion 256 seated on the beam 204, the end 268 of the shank portion 260 extends through and beyond each of the first passageway 276 and the second passageway 280 (i.e., through the assembly 230 of the beam 204 and the bracket 208) to be revealed outwardly of the assembly 230 of the beam 204 and the bracket 208. A position of the pin 240, as attained, refers to an 'engaged state' of the pin 240 with respect to the beam 204 and the bracket 208.

The retainer unit 246, as exemplarily shown, may be engaged with the end 268 so as to retain the shank portion 260 (and thus the pin 240) in the aforesaid engaged state. The retainer unit 246 may include a bolt 294 and a nut 298. The bolt 294 may be passed through the opening 278 into the through-hole 274 and an end section 302 of the bolt 294 may be revealed and extended out of the opening 282 of the through-hole 274—while at the same time, a bolt-head portion 310 of the bolt 294 may rest atop or over a portion of the outer surface 284 that surrounds the opening 278. The nut 298 may be coupled (e.g., by screwing) to the end section 302 to secure the bolt 294 to the end 268, in turn helping retain the pin 240 with the assembly 230 of the beam 204 and the bracket 208.

In one example, the retainer unit 246 includes a first washer piece 314 and a second washer piece 318, as shown. The first washer piece 314 may be positioned between the bolt-head portion 310 and the portion of the outer surface 284 that surrounds the opening 278. The second washer piece 318 may be similar to the first washer piece 314, and may be positioned between the nut 298 and the portion of the outer surface 284 that surrounds the opening 282. Furthermore, in some embodiments, the retainer unit 246 may include one or more washer members 304 and shims 306, as shown, positioned between the bolt-nut arrangement (i.e., formed by the bolt 294 and nut 298) and the first bracket portion 216 of the bracket 208. A size, shape, and specifications (e.g., thickness) of the washer members 304 and the shims 306, need to be viewed as being purely exemplary.

Although the retainer unit 246 has been disclosed to include the bolt 294, the nut 298, the first washer piece 314, the second washer piece 318, the washer members 304, and the shims 306, additional components, such as in the form of reinforcements, supports, spacers, etc., may be included or added to the retainer unit 246. In some cases, and depending upon an area of application, one or more components of the retainer unit 246 may also be omitted. Therefore, it will be appreciated that the retainer unit 246, as discussed above, is exemplary and may serve to illustrate one among the many ways by which the pin 240 may be retained to the assembly 230 of the beam 204 and the bracket 208. Accordingly, other methods of retaining the pin 240 to the assembly 230 of the beam 204 and the bracket 208 may be contemplated without departing from the scope and spirit of the present disclosure.

In one example, the pin 240 includes a layer 308 of an anti-seizure coating 312 disposed over the body 248. Such a layer 308 may be present over both the shank portion 260 and the head portion 256, facilitating prevention of seizure of the pin 240 within either of the first passageway 276 or the second passageway 280 and/or at an interface 316 where the head portion 256 may be in abutment or contact with the beam 204 while being seated on the beam 204. The layer 308 when disposed over the shank portion 260 may form and/or define the outer surface 284 of the shank portion 260. The anti-seizure coating 312 also promotes wear and corrosion resistance of the body 248 of the pin 240. Such an anti-seizure coating 312 may be provided on the pin 240 by way of electroplating, or by other customary methods. For example, the anti-seizure coating 312 includes Nickel. A thickness of the layer 308 of the anti-seizure coating 312 is exaggerated in FIG. 3 for ease in understanding.

Referring to FIG. 3, the body 248 of the pin 240 includes a grease gallery 320. The grease gallery 320 may include a longitudinal circular-shaped channel, although other profiles of the grease gallery 320 are possible. The grease gallery 320 may be open to the first axial end surface 264 of the body 248, thereby defining an opening 324 at the first axial end surface 264 of the body 248. The grease gallery 320 may extend from the first axial end surface 264 into the head portion 256, and may further pass, at least partly, into the shank portion 260 towards the second axial end surface 272 of the body 248 from the head portion 256. In other words, the grease gallery 320 is defined and formed through the head portion 256 to extend (e.g., entirely) across a thickness, H, (i.e., axially defined thickness) of the head portion 256, before transiting into the shank portion 260. Although not limited, a passage of the grease gallery 320 through the body 248 of the pin 240 may be defined along the longitudinal axis 252 of the body 248, as shown.

Further, the grease gallery 320 includes a first gallery portion 328 extending into the body 248 from the first axial end surface 264 and a second gallery portion 332 extending from the first gallery portion 328 towards the second axial end surface 272. A cross-sectional area of the first gallery portion 328 may be larger than a cross-sectional area of the second gallery portion 332, defining a counterbore 336 at the opening 324 of the grease gallery 320 and a stepped interface 340 between the first gallery portion 328 and the second gallery portion 332—with an inlet 344 to the second gallery portion 332 being defined at the stepped interface 340. As an example, the first gallery portion 328 is defined within the head portion 256, but stops short of the shank portion 260, as shown. Both the first gallery portion 328 and the second gallery portion 332 may include a circular cross-section, and may be formed by boring operations, for example, although other cross-sectional profiles, such as a hexagonal cross-sectional profile, and machining operations to attain such cross-sectional profiles may be contemplated by those of skill in the art. Moreover, both the first gallery portion 328 and the second gallery portion 332 may coaxially extend along the longitudinal axis 252 of the body 248.

The body 248 may define a number of grease passages 348 branching out from the grease gallery 320 up to the sections (e.g., the first section 288 and the second section 292) of the outer surface 284 of the shank portion 260. Given the two sections, the body 248 defines a first grease passage 352 branching out from the grease gallery 320 and extending up to the first section 288 and a second grease passage 360 branching out from the grease gallery 320 and extending up to the second section 292. Effectively, the grease gallery 320 is fluidly coupled with the first section 288 and the second section 292 of the outer surface 284 by way of the first grease passage 352 and the second grease passage 360. The first grease passage 352 and the second grease passage 360 are generally laterally disposed relative to the grease gallery 320, and, in some embodiments, may be disposed along a common plane. As an example, the first grease passage 352 and the second grease passage 360 are disposed at right angles to the grease gallery 320, although variations to the angles may be contemplated.

The grease fitting 244 may be received within the grease gallery 320 and may be fluidly coupled to the grease gallery 320 to facilitate a supply of grease into the grease gallery 320, and therefrom into the grease passages 348 (i.e., into the first grease passage 352 and the second grease passage 360) and further into the correspondingly defined, first section 288 and the second section 292, as shown. According to the depicted embodiment, the grease fitting 244 is (e.g., wholly) received within the first gallery portion 328 or the counterbore 336 and is fluidly coupled with the second gallery portion 332 to supply grease into the second gallery portion 332 of the grease gallery 320. As an example, the grease fitting 244 includes a base portion 368 and a fastening portion 372. The fastening portion 372 may be inserted and threadably coupled to the second gallery portion 332 at the inlet 344, while the base portion 368 may rest atop the stepped interface 340, as depicted. Also, it may be noted that the grease fitting 244 may include an orifice or a port 376 passing across the base portion 368 and the fastening portion 372, and through which grease or lubricant may be introduced (by having a hose or line coupled to the port 376) into the second gallery portion 332 of the grease gallery 320.

INDUSTRIAL APPLICABILITY

During operation, as the grader machine 100 performs a grading operation, the moldboard 164 may engage and scrape the materials 108 from the work surface 112 so as to receive the many materials 108 onto the face 192 of moldboard 164. The materials 108 of the work surface 112 may include a mix of debris, particles, dirt, sand, etc., of varying types, sizes, and forms, making it apt and apposite for the moldboard 164 to possess the requisite strength to cater to the influx of said materials 108 therein. As the moldboard 164 may engage and receive the materials 108, ensuing stresses may be developed within various parts of the coupler assembly 200—e.g., at the point or junction where the bracket 208 is coupled to the beam 204—i.e., the coupling 212. Alongside bearing such stresses, the coupling 212 may also endure the onslaught of the agglomerated and disintegrated particles rushing into the moldboard 164 during the grading operation. In some environments or applications, agglomerated and disintegrated particles of the work surface 112 may seep and/or crowd into an interface defined between the pin 240 and the passageways (i.e., the first passageway 276 and the second passageway 280), hampering the rotation of the beam 204 and the bracket 208 relative to the shank portion 260 of the pin 240. If the beam 204 and the bracket 208, in any such application or environment, were coupled by way of one or more coupler parts with no grease or lubricant therebetween, surfaces of said parts disposed in mutual contact with each other may rub against each other generating friction and heat, thus potentially causing one or more of the parts to seize relative to the other.

With the network of the grease gallery 320 and the grease passages 348 in the body 248 of the pin 240, a quantity of grease or lubricant may be effectively transferred all the way up to the first section 288 and the second section 292—for example, a conduit or a hose (not shown) carrying a grease or a lubricant may be fluidly coupled to the port 376 of the grease fitting 244 during servicing and repairs and the grease or lubricant may be introduced into the second gallery portion 332 of the grease gallery 320 through said conduit or the hose. The grease or lubricant once introduced into the second gallery portion 332 of the grease gallery 320, may further be forced into the grease passages 348 to further move all the way up to the first section 288 and the second section 292 of the outer surface 284 of the shank portion 260. Such transfer of grease or lubricant enables the first section 288 and the second section 292 to bear against the (respective) surfaces defining the first passageway 276 and the second passageway 280 of the beam 204 and the bracket 208 (or against the bearings positioned therebetween), in turn promoting wear resistance and mitigating occurrence of premature wear at the outer surface 284 of the shank portion 260 and/or at the surfaces defining the first passageway 276 and the second passageway 280. Resistance to wear is further supplemented by the layer 308 of the anti-seizure coating 312 (e.g., including Nickel) disposed over the body 248 of the pin 240.

Furthermore, given the accommodation of the grease fitting 244 within the first gallery portion 328 or the counterbore 336, any form of direct impact to the grease fitting 244 through the onslaught of the agglomerated and disintegrated particles is avoided, thus increasing or prolonging the life of the grease fitting 244. Also, the grease fitting 244, being disposed within the counterbore 336, may remain protected from any direct influx of the materials 108, as well. It may further be noted that the pin 240 having the head portion 256 and the shank portion 260 provides for a more simplified installation of the coupling 212 into the assembly 230 of the beam 204 and the bracket 208, unlike a pin that includes a constant cross-sectional area or diameter throughout its length—requiring to be retained to the beam 204 and the bracket 208 from both its ends, thus reducing operator effort and time during assembly.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A pin for a coupler assembly for rotatably coupling a beam of a circle assembly of a grader machine with a bracket of a moldboard assembly of the grader machine, the pin comprising:
    a body defining a head portion and a shank portion integrally extending from the head portion, the head portion adapted to be seated over one or more of the beam and the bracket, the shank portion adapted to pass through the beam and the bracket to rotatably couple the beam and the bracket about the shank portion, a grease gallery defined through the head portion and extending into the shank portion,
        wherein the body defines a plurality of grease passages branching out from the grease gallery up to corresponding sections of an outer surface of the shank portion where the beam and the bracket are correspondingly adapted to lie in rotatable registration with the shank portion, and
    a grease fitting within the grease gallery,
        wherein the grease fitting includes an orifice passing through a base portion and a fastening portion of the grease fitting to facilitate supply of grease or lubricant into the grease gallery.

2. The pin of claim 1, wherein a cross-sectional area of the head portion is larger than a cross-sectional area of the shank portion.

3. The pin of claim 1, further including a layer of an anti-seizure coating disposed over the body.

4. The pin of claim 3, wherein the anti-seizure coating includes nickel.

5. The pin of claim 1, wherein the body defines a longitudinal axis, the head portion and the shank portion being defined along the longitudinal axis, the head portion defining a first axial end surface of the body, the shank portion defining a second axial end surface of the body, the grease gallery being open to the first axial end surface of the body.

6. The pin of claim 5, wherein the grease gallery includes a first gallery portion extending into the body from the first axial end surface and a second gallery portion extending from the first gallery portion towards the second axial end surface, a cross-sectional area of the first gallery portion being larger than a cross-sectional area of the second gallery portion.

7. A coupler assembly for rotatably coupling a moldboard of a grader machine, the coupler assembly comprising:
    a bracket;
    a beam extending from a circle member of the grader machine;
    a pin including a body defining a head portion and a shank portion integrally extending from the head portion, the head portion adapted to be seated over one or more of the beam and the bracket, the shank portion adapted to pass through the beam and the bracket to rotatably couple the beam and the bracket about the shank portion, a grease gallery defined through the head portion and extending into the shank portion,
        wherein the body defines a plurality of grease passages branching out from the grease gallery up to corresponding sections of an outer surface of the shank portion where the beam and the bracket are correspondingly adapted to lie in rotatable registration with the shank portion; and
    a grease fitting received within the grease gallery and fluidly coupled thereto to facilitate supply of grease into the grease gallery and therefrom into the plurality of grease passages and the corresponding sections,
        wherein the grease fitting includes an orifice passing through a base portion and a fastening portion of the grease fitting to enable the grease to be introduced into the grease gallery.

8. The coupler assembly of claim 7, wherein a cross-sectional area of the head portion is larger than a cross-sectional area of the shank portion.

9. The coupler assembly of claim 7, wherein the pin includes a layer of an anti-seizure coating disposed over the body.

10. The coupler assembly of claim 9, wherein the anti-seizure coating includes nickel.

11. The coupler assembly of claim 7, wherein the body defines a longitudinal axis, the head portion and the shank portion being defined along the longitudinal axis, the head portion defining a first axial end surface of the body, the shank portion defining a second axial end surface of the body, the grease gallery being open to the first axial end surface of the body.

12. The coupler assembly of claim 11, wherein the grease gallery includes a first gallery portion extending into the body from the first axial end surface and a second gallery portion extending from the first gallery portion towards the second axial end surface, a cross-sectional area of the first gallery portion being larger than a cross-sectional area of the second gallery portion.

13. The coupler assembly of claim 12, wherein the grease fitting is received within the first gallery portion and is fluidly coupled with the second gallery portion to supply the grease into the second gallery portion.

14. A grader machine, comprising:
a circle member;
a beam extending from the circle member;
a moldboard to engage a work surface;
a bracket to support the moldboard;
a pin including a body defining a head portion and a shank portion integrally extending from the head portion, the head portion being seated over one or more of the beam or the bracket, the shank portion passing through the beam and the bracket to rotatably couple the beam with the bracket about the shank portion, a grease gallery defined through the head portion and extending into the shank portion,
  wherein the body defines a plurality of grease passages branching out from the grease gallery up to corresponding sections of an outer surface of the shank portion where the beam and the bracket correspondingly lie in rotatable registration with the shank portion; and
a grease fitting received within the grease gallery and fluidly coupled thereto to facilitate supply of grease into the grease gallery and therefrom into the plurality of grease passages and the corresponding sections,
  wherein the grease fitting includes an orifice passing through a base portion and a fastening portion of the grease fitting to enable the grease to be introduced into the grease gallery.

15. The grader machine of claim 14, wherein a cross-sectional area of the head portion is larger than a cross-sectional area of the shank portion.

16. The grader machine of claim 14, wherein the pin includes a layer of an anti-seizure coating disposed over the body.

17. The grader machine of claim 16, wherein the anti-seizure coating includes nickel.

18. The grader machine of claim 14, wherein the body of the pin defines a longitudinal axis, the head portion and the shank portion being defined along the longitudinal axis, the head portion defining a first axial end surface of the body, the shank portion defining a second axial end surface of the body, the grease gallery being open to the first axial end surface of the body.

19. The grader machine of claim 18, wherein the grease gallery includes a first gallery portion extending into the body from the first axial end surface and a second gallery portion extending from the first gallery portion towards the second axial end surface, a cross-sectional area of the first gallery portion being larger than a cross-sectional area of the second gallery portion.

20. The grader machine of claim 19, wherein the grease fitting is received within the first gallery portion and is fluidly coupled with the second gallery portion.

* * * * *